(No Model.)
G. B. HENRY.
SECONDARY CELL OR BATTERY.
No. 517,455.  Patented Apr. 3, 1894.
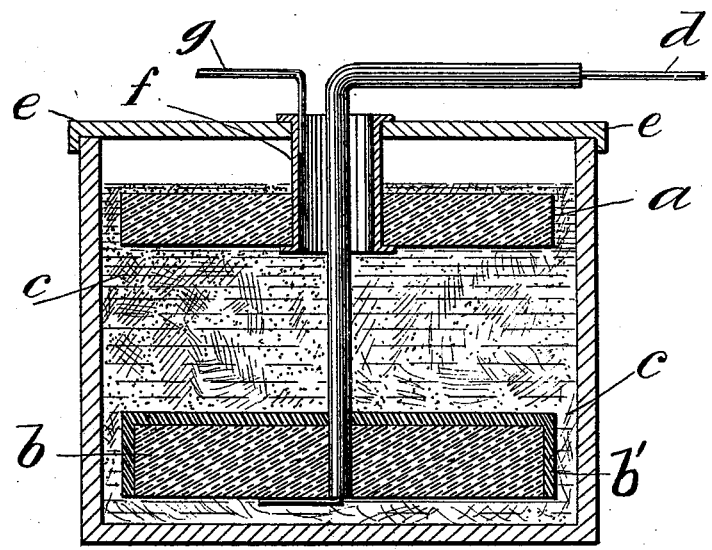

UNITED STATES PATENT OFFICE.

GEORGE B. HENRY, OF HARTFORD, CONNECTICUT.

SECONDARY CELL OR BATTERY.

SPECIFICATION forming part of Letters Patent No. 517,455, dated April 3, 1894.

Application filed June 21, 1893. Serial No. 478,351. (No model.)

*To all whom it may concern:*

Be it known that I, GEORGE B. HENRY, of Hartford, in the county of Hartford and State of Connecticut, have invented certain new and useful Improvements in Secondary Cells or Batteries, of which the following is a full, clear, and exact description, whereby any one skilled in the art can make and use the same.

The object of my invention is to produce a secondary battery, also known as a storage cell or accumulator, in which the several plates shall be made of a material not liable to buckle and increase the resistance of the cells as in the case where lead plates are used; and a further object is to produce a more effective cell of less weight and cost as compared with prior batteries of this class.

To this end my invention consists in the details of the several elements making up the battery and in the combination of such elements and parts as more particularly hereinafter described and pointed out in the claims.

The drawing is a view in central cross section of a cell showing the arrangement of the several elements.

In the accompanying drawing the letter $a$ denotes one of the plates and $b$ the other plate of the cell which are arranged in an electrolyte $c$, the two plates occupying a position at suitable distance apart when supported within the cell. These plates are preferably composed of vegetable carbon produced by carbonizing a pasty mass of material, such as wheat, and barley or the like, moistened and then pressed to shape. Coke carbon may be used if desired but I prefer the vegetable carbon for the reason that it is more porous and in use emits less gas. The lower plate $b$ is covered with a paste $b'$ of chloride of lead which may be produced by treating red lead with nitric and hydrochloric acid. One of the terminals $d$ is secured to the carbon, as by soldering it onto a metallic covered surface, and then extends through the electrolyte, being insulated by a rubber cover. The other plate is suspended from a cover or support $e$ by means of a tubular piece of metal $f$ to which the other terminal $g$ is secured, as by soldering. The electrolyte $c$ is made up of a gelatinous mass of flax seed produced by boiling the seed in water to a proper consistency and then allowing it to cool and stiffen and then stirring into it a solution of sulphuric acid in water. This spongy mass is poured into a vessel and surrounds both the plates. The advantages of this construction of cell reside in the lessening of the weight in the use of the carbon plates, in the freedom from buckling and consequent prevention of any increase in the resistance within the cell by such buckling; in the greater capacity of the plates and increase of electro motive force and also in the cheapness of manufacture as compared with the battery of the prior art.

My improved cell is charged in the usual manner by the passage of a charging current in one direction through the cell and in use it is discharged in the opposite direction.

In the preparation of the lower or active plate $b$ by taking oxide of lead, known as red lead, and subjecting it to the action of equal parts of concentrated or chemically pure nitric and hydrochloric acids, chloride of lead is precipitated; then subjecting this chemical to heat about 300° or more Fahrenheit a suboxide is produced in a chemically pure state. This is pulverized when cold and sifted over the carbon plate $b$ placed at the bottom of the cell.

In preparing the coating $b'$ of the active or lower plate $b$ the ingredients have been combined in the following proportions, but these proportions may be varied without departing from the invention: To one pound of red lead one-eighth of a pound each of concentrated hydrochloric and nitric acid are used, a plate thus constructed being of great efficiency and practically indestructible. The best results have been found to accrue by the use of sulphuric acid, composing in part the electrolyte, having a density of about 1,100° as indicated by a hydrometer.

The actions and reactions occurring during charging and discharging are as follows: The electric current enters from the positive pole of the dynamo through the terminal $g$ to the upper plate $a$ from whence it passes through the electrolyte $c$ to the active material $b'$ (chloride of lead) which is smeared on the plate $b$. This action of the electric current passes through the acid, changes the molecules, and the density of the acid is thereby increased. From the plate $b$ the electric current passes back to the negative pole of the dynamo through the terminal $d$. The immediate result of the action of the electric current on the active material $b'$ that is in the form of a sub-oxide solidifies the lead and changes it to a black oxide, this causing the plate to operate as an active plate of the cell on discharging. On discharging, the sulphuric acid acting on the oxide of the active plate changes the oxide back to its natural state thereby generating an electric current that passes through the electrolyte to the top plate and out through a terminal $g$ and back by the usual connection through the terminal $g$, this direction of the current being reversed from the direction used in charging the battery. The reaction of the electric current on discharging reduces the density of the sulphuric acid back to 1,100°, indicated by hydrometer.

I claim as my invention—

1. In a secondary cell or battery in combination the plates with their terminals, and an electrolyte composed of a spongy mass of flax seed mixed with dilute sulphuric acid, all substantially as described.

2. In a secondary cell in combination an electrolyte, and plates composed of a mass of vegetable carbon, one of the plates being provided with a layer of chloride of lead, all substantially as described.

3. In a secondary cell in combination an electrolyte composed of a spongy mass of flaxseed and a solution of sulphuric acid suspended therein, plates composed of a vegetable carbon, a coating of chloride of lead on one of the plates, and the terminals, all substantially as described.

GEORGE B. HENRY.

Witnesses:
CHAS. L. BURDETT,
J. A. CANTON.